(12) United States Patent
Cramer

(10) Patent No.: US 7,383,694 B2
(45) Date of Patent: Jun. 10, 2008

(54) LUBRICATION ASSEMBLY FOR GLASSWARE FORMING MOLDS

(75) Inventor: Jeffrey W. Cramer, Liberty Center, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 388 days.

(21) Appl. No.: 11/058,938

(22) Filed: Feb. 15, 2005

(65) Prior Publication Data

US 2006/0179881 A1   Aug. 17, 2006

(51) Int. Cl.
C03B 35/00   (2006.01)
(52) U.S. Cl. .................. 65/26; 65/66; 65/170
(58) Field of Classification Search .......... 65/26, 65/66, 170
See application file for complete search history.

(56) References Cited

U.S. PATENT DOCUMENTS

| 3,141,752 A | 7/1964 | Keller |
|---|---|---|
| 3,672,860 A | 6/1972 | Keller |
| 4,120,683 A | 10/1978 | Irwin |
| 4,165,974 A | 8/1979 | Goodwin et al. |
| 4,526,600 A | 7/1985 | Myers |
| 4,604,120 A | 8/1986 | Brown |
| 4,648,893 A | 3/1987 | Roux |
| 4,765,821 A | 8/1988 | Doud |
| 4,861,363 A | 8/1989 | Brown |
| 4,867,777 A | 9/1989 | Doud |
| 4,990,171 A | 2/1991 | Kojima et al. |
| 5,679,409 A | 10/1997 | Seeman |
| 5,746,800 A | 5/1998 | Ambrogio |
| 5,785,727 A | 7/1998 | Mine et al. |
| 5,938,806 A | 8/1999 | Mine et al. |
| 5,958,099 A | 9/1999 | Morettin |
| 2003/0159467 A1 | 8/2003 | Hirota et al. |
| 2003/0175424 A1 | 9/2003 | Seeman |
| 2003/0221455 A1 | 12/2003 | Scott et al. |

FOREIGN PATENT DOCUMENTS

| EP | 0 561203 | * | 9/1993 |
|---|---|---|---|
| EP | 0561203 | | 9/1993 |

* cited by examiner

*Primary Examiner*—Mark Halpern

(57) ABSTRACT

An apparatus for lubricating a mold in an individual section glassware forming machine by combustion of at least one combustible gas. The apparatus includes a shaft positioned adjacent to the mold, a burner head on the shaft and including a spark electrode for igniting a combustible gas exiting the burner head, a manifold on the shaft spaced from the burner head for connection to a combustible gas supply, and a gas passage within the shaft extending from the manifold to the burner head.

8 Claims, 6 Drawing Sheets

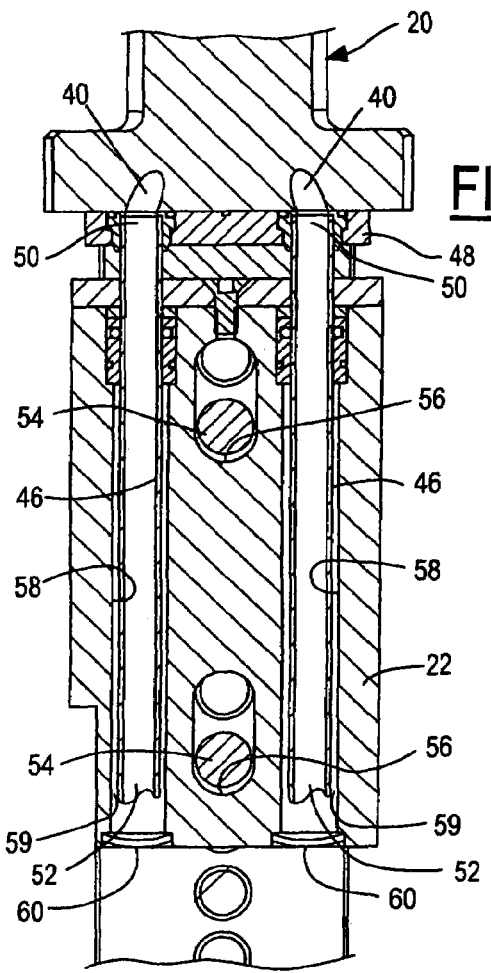
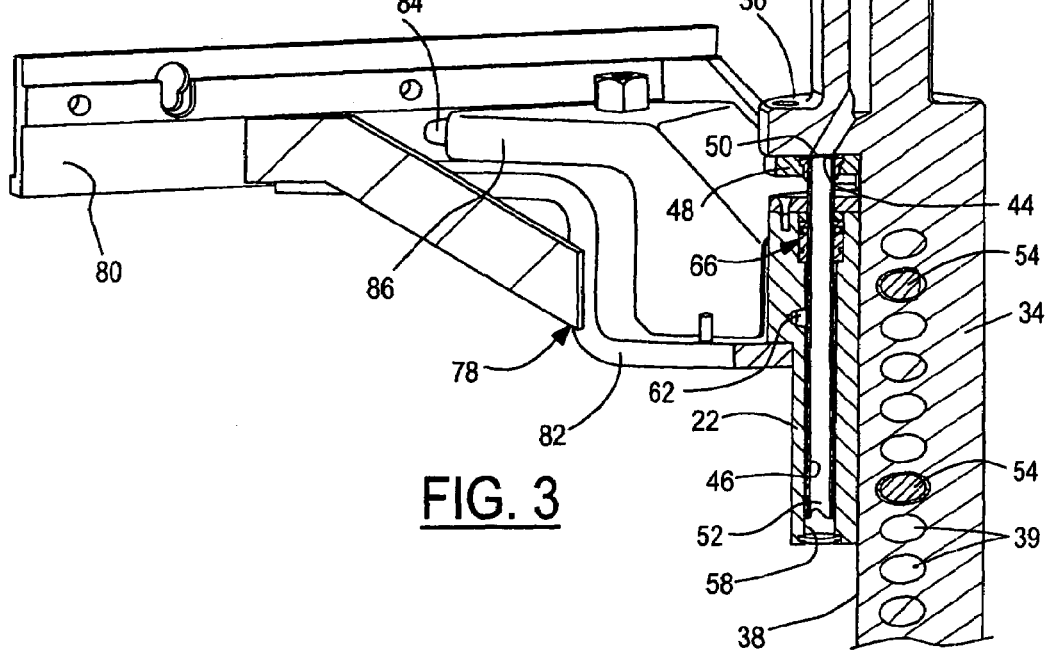

LUBRICATION ASSEMBLY FOR GLASSWARE FORMING MOLDS

FIELD OF THE INVENTION

This invention relates generally to forming glassware, and more particularly to lubricating glassware forming molds.

BACKGROUND OF THE INVENTION

Articles of glassware commonly are formed by blow molding in one or more molds. Individual section glassware forming machines typically include a set of blank molds wherein glass gobs are formed into glass blanks. The glass blanks are transferred to final blow molds in which they are formed into their final desired shape. Glassware forming molds are typically lubricated by manually swabbing or by igniting a combustible gas to deposit carbon soot in the molds. The combustible gas is fed to a burner head by one or more externally routed hoses, and may be fed through a nozzle to an igniter.

SUMMARY OF THE INVENTION

An apparatus is provided for lubricating a mold in an individual section glassware forming machine by combustion of at least one combustible gas. The apparatus includes a shaft positioned adjacent to the mold, a burner head on the shaft and including a spark electrode for igniting a combustible gas exiting the burner head, a manifold on the shaft spaced from the burner head for connection to a combustible gas supply, and a gas passage within the shaft extending from the manifold to the burner head.

According to one presently preferred embodiment of an apparatus for lubricating a mold, the burner head is slidably carried by a manifold block on the shaft for adjustment lengthwise of the shaft while maintaining connection between the burner head and the gas passage. This readily permits adjustment of the position of the burner head relative to molds in the glassware forming machine. Preferably a seal is carried by either the burner head or the manifold block to provide a gas-tight seal between them, even as they are adjusted.

According to one presently preferred embodiment of an apparatus for lubricating a mold, a pair of gas passages are provided in the shaft with each communicating with the manifold and burner head. Each passage is adapted to receive a combustible gas. In one implementation, oxygen is fed through one passage, and MAPP (methylacetylenepropadine) gas through the other. The gases are fed through the burner head and exit the burner head in the area of a nozzle that includes an igniter, such as a spark electrode assembly, that ignites the mixed oxygen and MAPP gas. Compressed air for cleaning the igniter, for example, can be fed through a third passage, if desired.

BRIEF DESCRIPTION OF THE DRAWINGS

These and other objects, features, advantages and aspects of the present invention will be apparent from the following detailed description of the preferred embodiments and best mode, appended claims and accompanying drawings in which:

FIG. 3 is a fragmentary sectional view of the mold lubrication assembly;

FIG. 5 is a fragmentary sectional view of the manifold block illustrating separate gas passages therein;

DETAILED DESCRIPTION OF THE PREFERRED EMBODIMENTS

Figure 1:
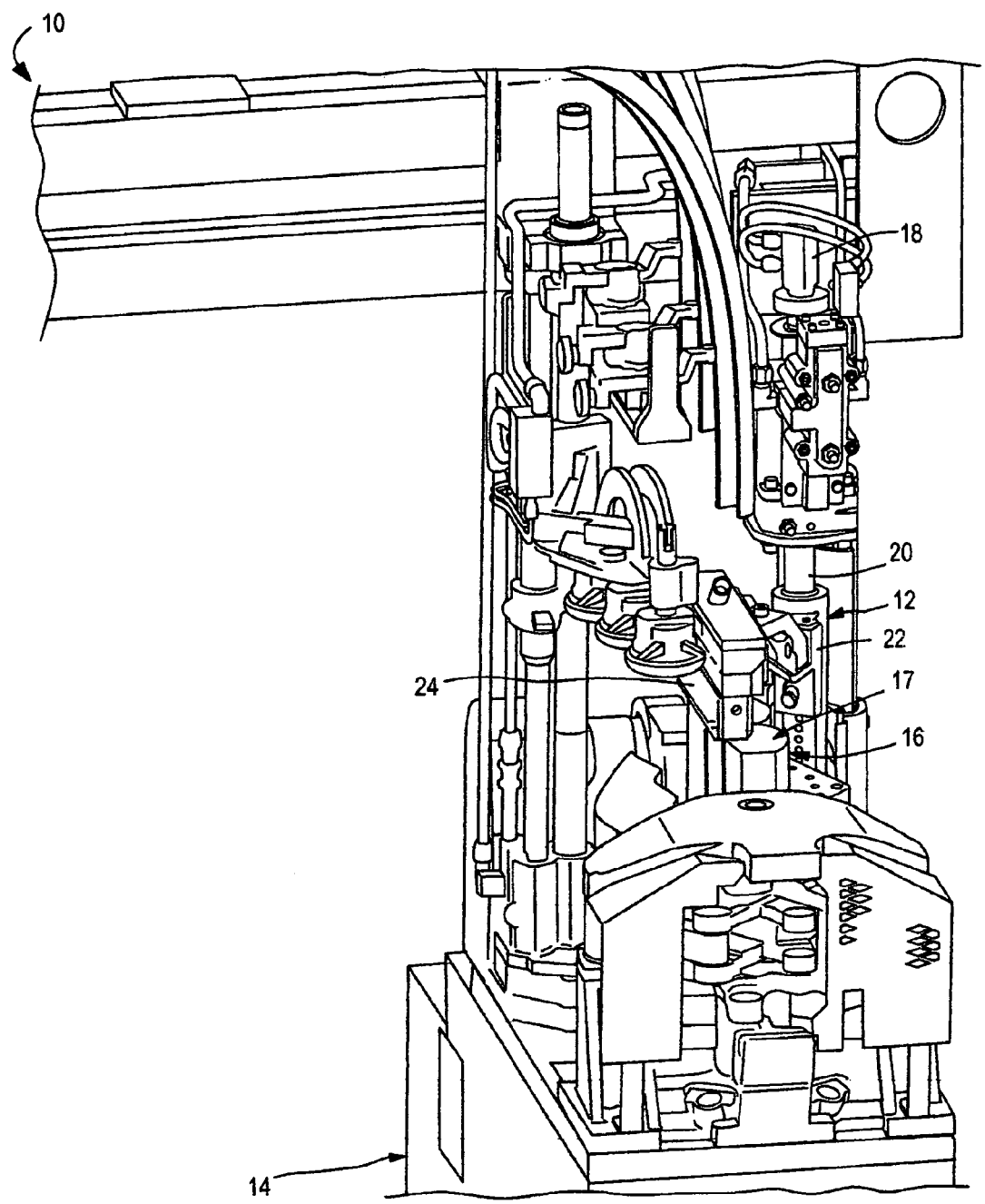
FIG. 1 is a fragmentary perspective view of a glassware forming machine including a glass mold lubrication assembly according to one presently preferred embodiment of the invention.

Referring in more detail to the drawings, FIG. 1 illustrates a portion of an individual section glassware forming machine 10 that includes a mold lubrication assembly 12 constructed according to one presently preferred embodiment of the present invention. The machine 10 includes an individual section 14 with one or more arms 16 in which one or more molds (one-half of which is nominally shown at 17) are supported to form articles of glassware, such as glass containers. The mold lubrication assembly 12 ignites a combustible gas mixture to deposit carbon soot within the molds to lubricate the molds 17 without the need for manual swabbing.

As best shown in FIGS. 2-6, the mold lubrication assembly 12 generally includes a supply manifold 18, a shaft 20, a manifold block 22, and a burner head 24. The shaft 20 may mount a load funnel (not shown) in some individual section glassware forming applications, although a funnel is not used in the presently preferred embodiment shown and described herein. The manifold 18 is disposed at one end of the shaft 20 and has one or more separate passages 26 (FIGS. 2 and 3) each of which communicate at one end with separate gas supplies 28 and at their other end with the shaft 20. The manifold 18 may be retained on the shaft 20 by a tapered split-clamp 30, or by any other suitable connection. In the embodiment shown, the manifold 18 has two passages 26. The passages 26 preferably are separately formed in the manifold 18 and do not communicate with each other.

The shaft 20 preferably includes a pair of straight cylindrical rod portions 32 with one rod portion 32 at each end of the shaft 20. Each rod portion 32 is journalled in a recess or bore of the machine to permit rotation of the shaft 20 and/or related components relative to the molds and other machine components. A central portion 34 is disposed between the rod portions 32, and may be integrally formed with or separate from and clamped or otherwise connected to the rod portions 32. The central portion 34 may include an annular flange 36 and a flat side 38 with a plurality of blind bores 39 therein which may be threaded for receipt of a bolt. Two passages 40 are separately formed in at least one rod portion 32 and preferably in at least part of the central portion 34 of the shaft 20. At one end 42, each passage 40 communicates with a separate one of the passages 26 in the manifold 18, and at their other end 44, each passage extends to a separate one of two supply tubes 46 that are carried by the shaft 20 such as by a retaining plate 48 bolted to the flange 36. The supply tubes 46 are preferably straight cylindrical tubes that are open at each end 50, 52.

Figure 4:
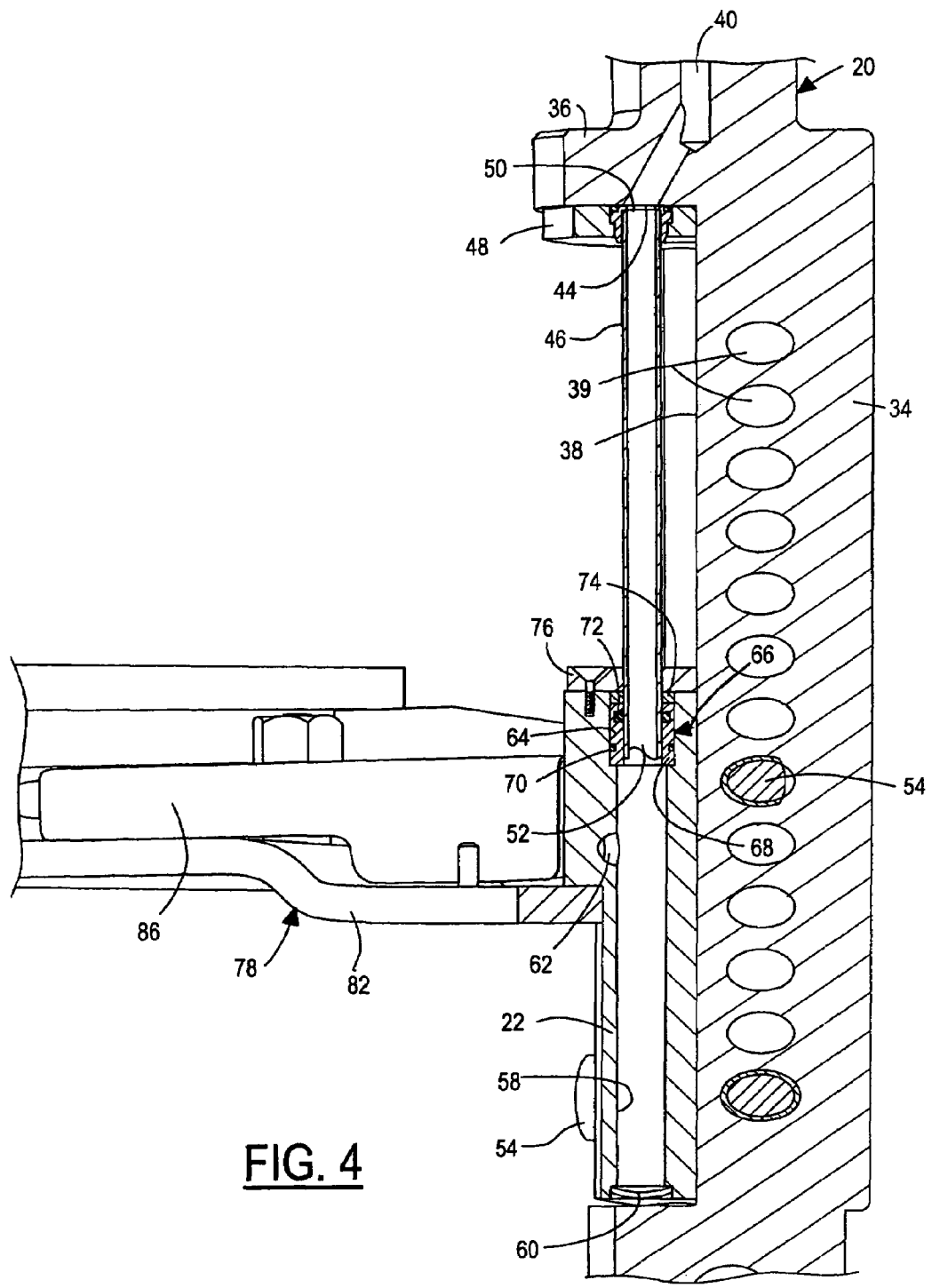
FIG. 4 is an enlarged fragmentary sectional view showing an adjustable manifold block and adjacent components.

The manifold block 22 is carried by the shaft 20, such as by a pair of bolts 54 (FIG. 5) received through spaced openings 56 in the block 22 and in one of the bores 39 in the shaft 20. Preferably, a plurality of bores 39 are provided in the shaft 20 so that the manifold block 22 can be retained in several different positions as desired. FIG. 3 illustrates the manifold block 22 in one position adjacent to the flange 36, and FIG. 4 shows the manifold block 22 in another position extended as far away from the flange 36 as is possible in this embodiment. This permits lengthwise adjustment of the manifold block 22 relative to the shaft 20. Otherwise, the manifold block 22 may be clamped to the shaft 20 in different positions, or otherwise adjustably coupled to the shaft 20. The manifold block 22 includes a pair of bores 58, each aligned with and adapted to receive a separate one of the supply tubes 46. The bores 58 have an inner diameter that is larger than the outer diameter of the supply tubes 46 providing a gap or flow path 59 in each bore 58 around the outside of its associated supply tube 46. The bores 58 are preferably closed at one end, such as by plugs 60. The manifold block 22 also includes a pair of separate outlets 62 each communicated with a separate one of the bores 58, preferably between the ends of the bores 58. At one end, each bore 58 preferably includes an enlarged counterbore 64.

As best shown in FIGS. 4 and 5, to provide a seal between the manifold block 22 and the supply tubes 46, a seal assembly 66 is preferably disposed in each counterbore 64. Each seal assembly 66 includes a seal gland or retainer 68 having an outer groove in which an outer seal 70 is received between the retainer 68 and manifold block 22, an inner groove in which an inner seal 72 is received between the retainer 68 and the adjacent supply tube 46, and a wiper 74 surrounding the supply tubes 46 to remove contaminants from the supply tubes 46 as the manifold block 22 is moved relative to the supply tubes 46. The inner seal 72 is positioned so that the open end of the supply tubes 46 within the bores 58 and the outlets 62 are between the inner seal 72 and the plugs 60. This ensures that the flow paths 59 between the supply tubes 46 and the manifold block 22 within the bores 58 remain sealed in all positions of the manifold block 22. The wiper 74 may be disposed between the retainer 68 and a cap plate 76 attached to the manifold block 22 to keep the wiper 74 and retainer 68 in the counterbore 64.

Figure 2:
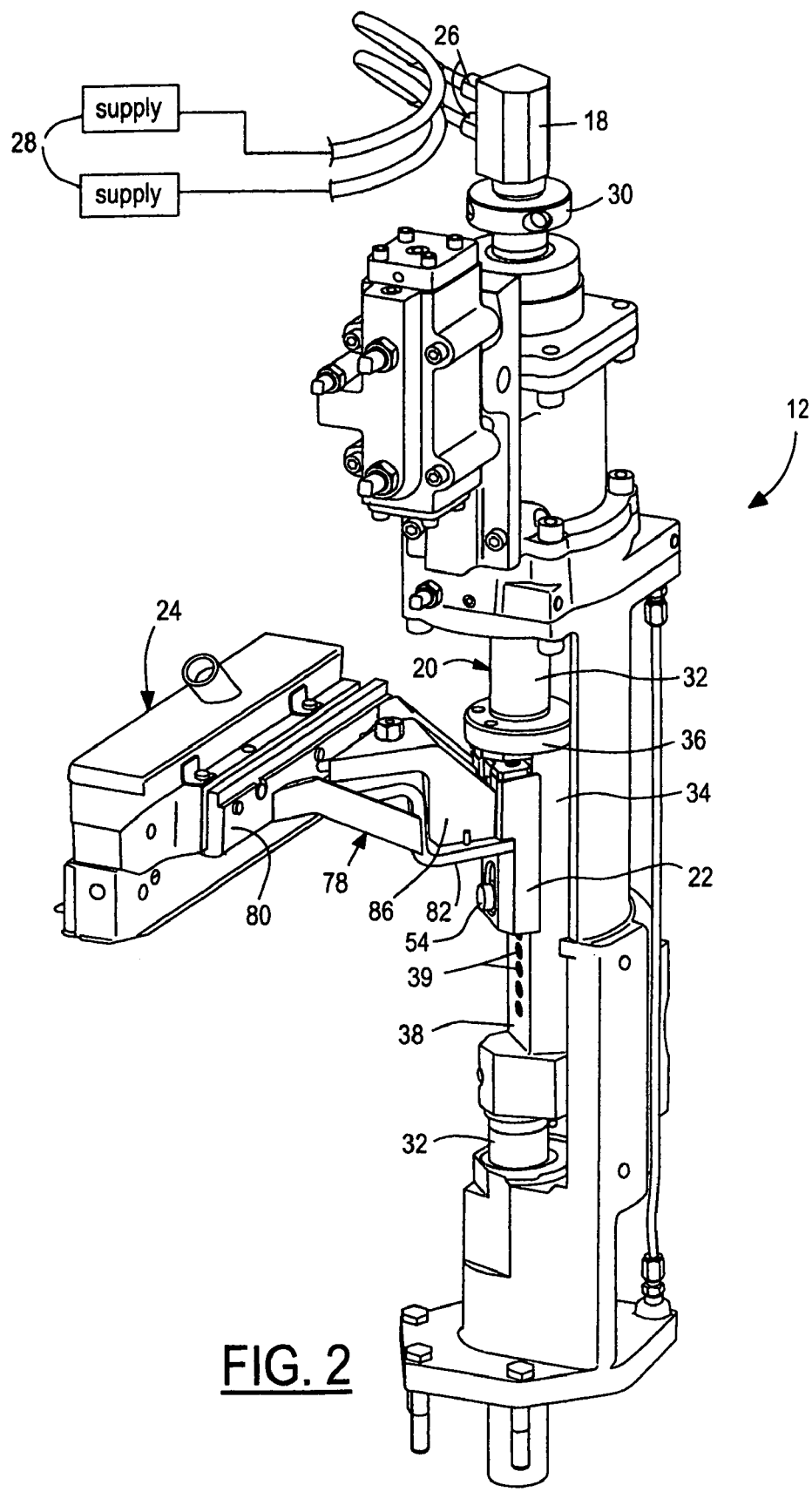
FIG. 2 is a perspective view of the mold lubrication assembly.
Figure 6:
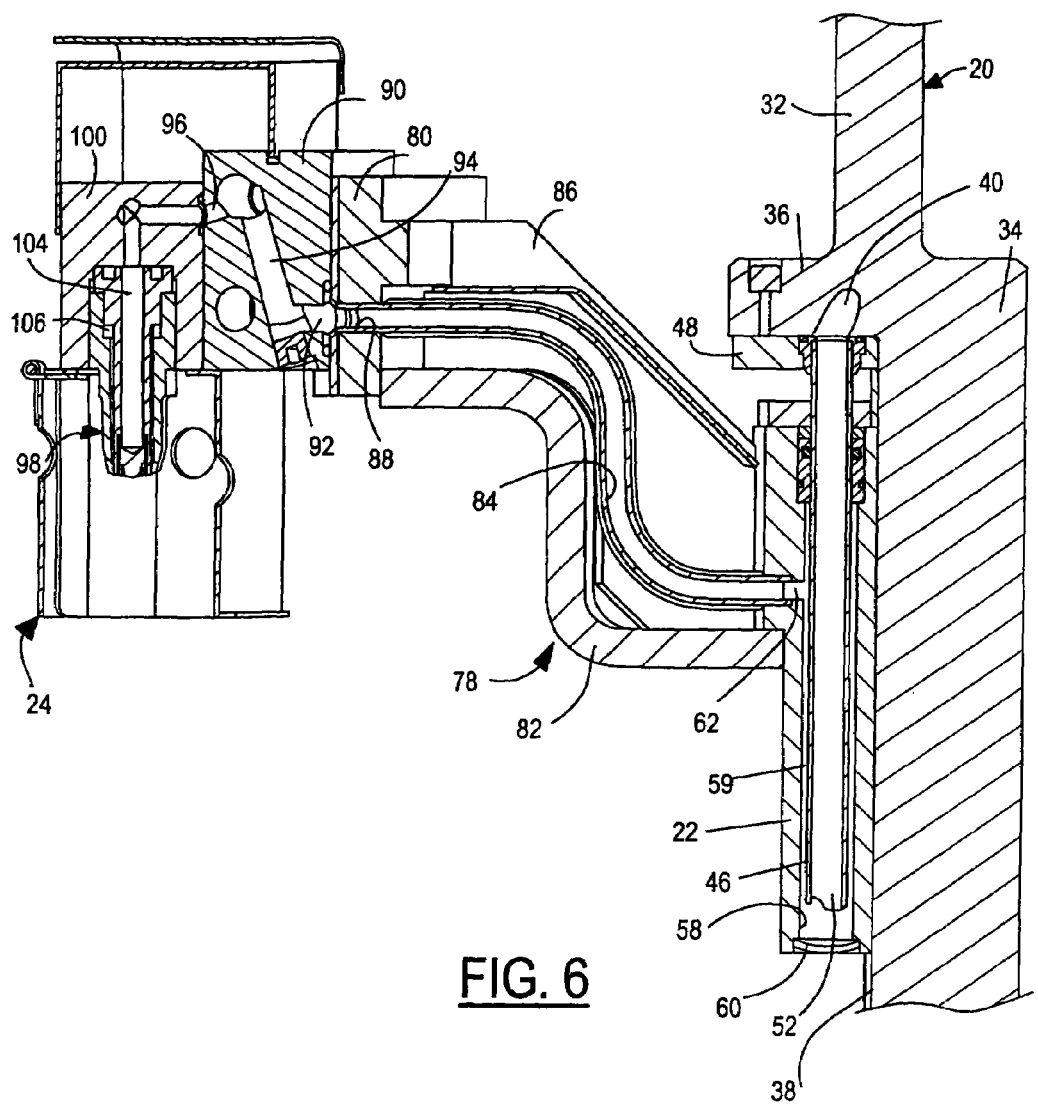
FIG. 6 is a fragmentary sectional view generally illustrating the manifold block and a burner head.

As best shown in FIGS. 2, 3 and 6, an arm 78 is connected to and extends outwardly from the manifold block 22. The arm 78 includes a mounting plate 80 to which the burner head 24 is attached, a base 82 extending between the manifold block 22 and the mounting plate 80, a pair of connecting tubes 84 (best shown in FIG. 6), and a cover 86 carried by the base 82 and disposed over the connecting tubes 84. As shown in FIG. 6, each connecting tube 84 communicates at one end with a separate one of the manifold block outlets 62, and is fitted at its other end in a separate one of a pair of openings 88 (FIG. 6) in the mounting plate 80. The arm 78 provides an extension from the manifold block 22 on the shaft 20, to the burner head 24 so that the burner head 24 can be correctly positioned relative to the molds to be lubricated. The arm 78 is adjustable axially of the shaft 20 with the manifold block 22.

Figure 7:
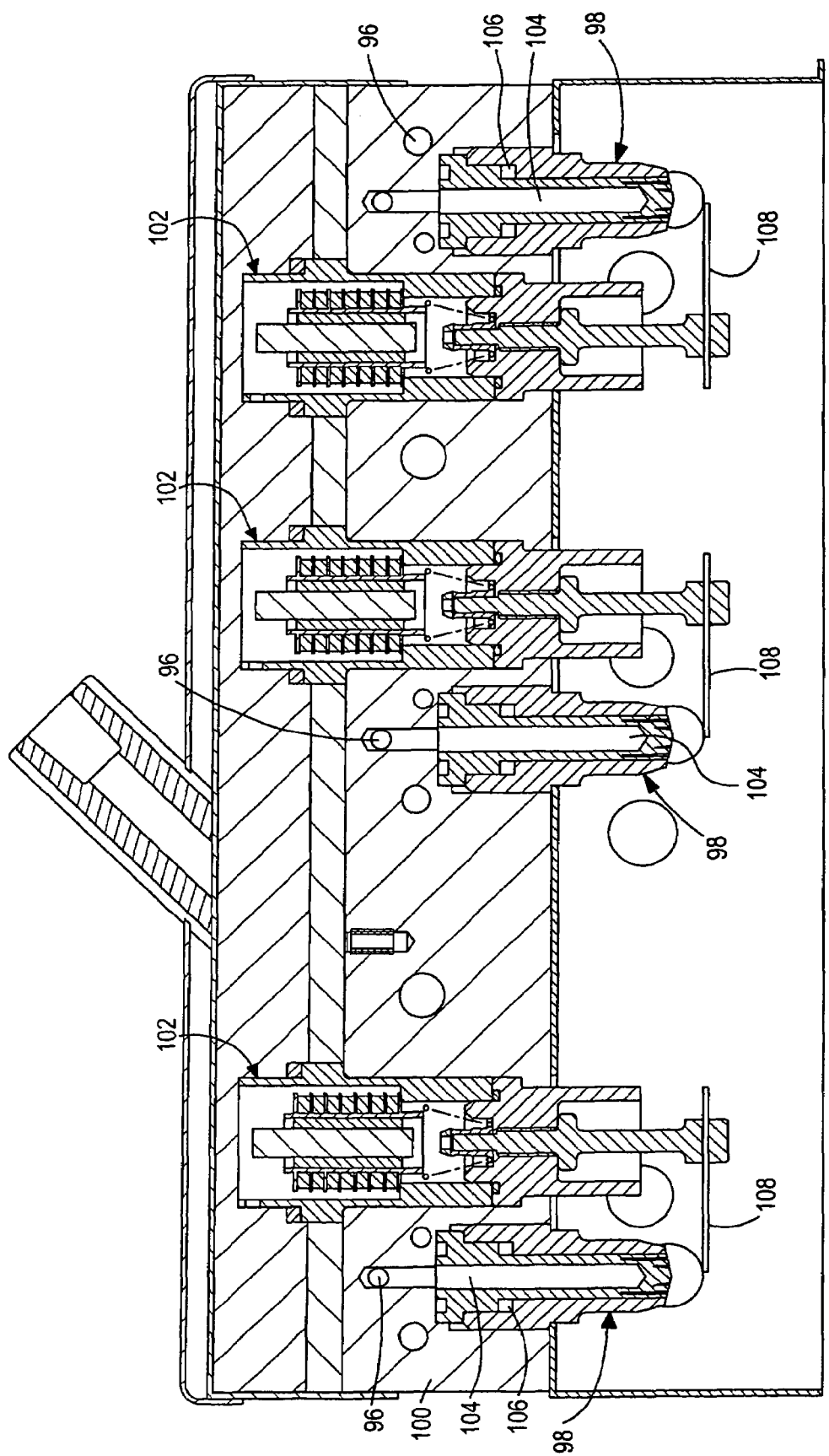
FIG. 7 is sectional view of the burner head.

As best shown in FIGS. 2, 6 and 7, the burner head 24 is carried by the arm 78, such as by being bolted to the mounting plate 80. As best shown in FIG. 6, the burner head 24 includes a distribution manifold 90 having a pair of inlets 92, with each inlet 92 communicating with a separate one of the connecting tubes 84. Each inlet 92 leads to a passage 94 in the distribution manifold 90 that branches into one or more and shown as three separate nozzle passages 96. Each nozzle passage 96 leads to one of three nozzles 98 carried by a burner module 100 of the burner head 24. Therefore, each nozzle 98 receives two separate gas flows. Preferably, the nozzles 98 maintain the gas flows separate until after they are discharged from the nozzles 98 for combustion by igniters 102 disposed adjacent to each nozzle 98. For example, the nozzles 98 may have a central passage 104 and corresponding outlet, and a radially outwardly spaced second passage 106 surrounding at least a portion of the central passage 104. The nozzles 98 may be generally as described in U.S. patent application Ser. No. 10/855,830, the disclosure of which is incorporated herein in its entirety. The igniters 102 may include an electrode 108 disposed in the area of the nozzle outlets to ignite the combustible gas mixture ejected from the nozzles 98 such as by generating a spark at the electrode. The igniters 102 can be constructed as set forth in U.S. Patent Application Publication No. 2003/0221455A1 published Dec. 4, 2003, the disclosure of which is incorporated herein by reference in its entirety, or the igniters may be of conventional construction. The details and structure of the igniters 102 will not be further described.

So constructed and arranged, two gas supplies 28 are communicated with each of the nozzles 98 to provide a combustible gas mixture discharged from the nozzles 98 in the area of the igniters 102. More specifically, from the gas supplies 28 two separate gas flows preferably are maintained at least up to nozzles 102, and preferably until discharge from the nozzles 98. From each supply 28, gas flows through the manifold 18, the passages 40 in the shaft 20, the supply tubes 46, in the flow paths 59 between the manifold block 22 and the tubes 56 and to the outlets 62, through the connecting tubes 84, into the burner head passages 94, 96, and into and through the nozzles 98. In one implementation, MAPP gas is routed through one of the flow paths, and oxygen is routed through the other flow path. If desired, one passage or more than two passages can be provided in like manner. In some embodiments, for example, it may be desirable to provide a third flow path for compressed air that may help inhibit or prevent carbon build-up on the igniter electrodes and the nozzles to reduce cleaning or other maintenance requirements for these components.

It should be recognized that upon reading the disclosure herein, one originally skilled in the art would readily recognize embodiments other than those disclosed herein, with those embodiments being within the scope of the claims that follow. Accordingly, this disclosure herein is intended to be exemplary, and not limiting. The scope of the invention is defined by the claims that follow.

The invention claimed is:

1. Apparatus for lubricating a mold in a glassware forming machine by combustion of at least one combustible gas, which includes:
   a shaft adjacent to the mold and having at least one internal gas passage,
   a manifold block mounted on said shaft and adjustably positionable lengthwise of said shaft,
   an arm extending from said manifold block in a direction lateral to said shaft,
   said manifold block and said arm including at least one internal gas passage,
   a coupling connecting said internal gas passage in said shaft to said internal gas passage in said manifold block and said arm throughout adjustable positioning of said manifold block on said shaft, and
   a burner head mounted on an end of said arm spaced from said manifold block, and including at least one burner nozzle and an internal gas passage connecting said nozzle to said internal gas passage in said arm.

2. The apparatus set forth in claim 1 wherein said coupling includes at least one bore in said manifold block and coupled to said at least one internal gas passage in said manifold block and said arm, at least one tube extending from said at least one passage in said shaft into said bore, and a gap between said tube and said bore for passage of gas from said tube through said bore into said at least one internal gas passage in said manifold block and said arm.

3. The apparatus set forth in claim 2 wherein said manifold block includes a seal in said bore in sliding sealing engagement with said tube, and a plug at an end of said bore remote from said seal.

4. The apparatus set forth in claim 1 wherein there are at least two separate internal gas passages in said shaft, at least two separate couplings on said manifold block, at least two separate internal gas passages in said manifold block and said arm separately feeding combustible gases to said at least one nozzle.

5. The apparatus set forth in claim 4 wherein said burner head includes a plurality of said nozzles, all of which receive said combustible gases.

6. The apparatus set forth in claim 1 including a supply manifold on an end of said shaft spaced from said manifold block for coupling said at least one internal gas passage in said shaft to an external gas supply.

7. The apparatus set forth in any preceding claim wherein said manifold block is adjustably mounted on said shaft by means of fasteners extending through said manifold block into selected ones of a series of internally threaded openings in said shaft.

8. The apparatus of claim 1 wherein the shaft is carried by the glassware forming machine for rotation relative to a mold.

* * * * *